United States Patent
Wu et al.

(10) Patent No.: US 12,170,070 B2
(45) Date of Patent: Dec. 17, 2024

(54) METHOD AND FOR DRIVING ELECTRONIC PAPER DISPLAY DEVICE, DEVICE, AND READABLE MEDIUM

(71) Applicants: Chongqing BOE Smart Electronics System Co.,Ltd., Chongqing (CN); BOE TECHNOLOGY GROUP CO., LTD., Beijing (CN)

(72) Inventors: Yuanke Wu, Beijing (CN); Tao Pu, Beijing (CN); Yong Li, Beijing (CN); Heng Zheng, Beijing (CN); Subo Wan, Beijing (CN)

(73) Assignees: Chongqing BOE Smart Electronics System Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/024,031

(22) PCT Filed: Mar. 31, 2022

(86) PCT No.: PCT/CN2022/084620
§ 371 (c)(1),
(2) Date: Feb. 28, 2023

(87) PCT Pub. No.: WO2023/184423
PCT Pub. Date: Oct. 5, 2023

(65) Prior Publication Data
US 2024/0282276 A1  Aug. 22, 2024

(51) Int. Cl.
*G09G 3/34* (2006.01)
*G02F 1/167* (2019.01)
*G02F 1/1676* (2019.01)

(52) U.S. Cl.
CPC ............. *G09G 3/344* (2013.01); *G02F 1/167* (2013.01); *G02F 1/1676* (2019.01); *G09G 2310/08* (2013.01)

(58) Field of Classification Search
USPC ........................................................ 345/107
See application file for complete search history.

(56) References Cited

U.S. PATENT DOCUMENTS

2006/0139748 A1* 6/2006 Ahn .................. G02F 1/167
                                                        359/396
2017/0153526 A1* 6/2017 Okabe .................. G02F 1/167
(Continued)

FOREIGN PATENT DOCUMENTS

CN     107492349 A    12/2017
CN     111402818 A    7/2020
(Continued)

*Primary Examiner* — Chineyere D Wills-Burns
(74) *Attorney, Agent, or Firm* — HOUTTEMAN LAW LLC

(57) ABSTRACT

A driving method for an electronic paper display device is provided, belongs to the field of display technology, and can solve the problem of ghost in the existing electronic paper display device. A driving stage of the electronic paper display device includes a first shaking stage including a first sub-shaking stage; the balance stage is before the display stage. The method includes: based on a to-be-displayed image, applying first, second and third driving signals to first electrodes in macrostructures to display black, white and red, respectively; applying a voltage signal to the second electrodes, the voltage signal includes an alternating second pulse signal in which positive, zero and negative voltages are sequentially alternated in the first sub-shaking stage; the first and second pulse signals are equal in an absolute value of an active voltage and are opposite to each other in voltage polarity.

20 Claims, 9 Drawing Sheets

(56) References Cited

U.S. PATENT DOCUMENTS

| | | | | |
|---|---|---|---|---|
| 2017/0263176 A1* | 9/2017 | Lin | .................. | G09G 3/2003 |
| 2019/0325804 A1* | 10/2019 | Lin | .................. | G02F 1/1685 |
| 2019/0339582 A1* | 11/2019 | Lo | .................. | H10K 71/621 |
| 2020/0184906 A1* | 6/2020 | Lin | .................. | G09G 3/344 |
| 2020/0320921 A1* | 10/2020 | Lin | .................. | G02F 1/1685 |
| 2020/0379312 A1* | 12/2020 | Wu | .................. | G02F 1/1685 |
| 2021/0142740 A1* | 5/2021 | Gao | .................. | G02F 1/1676 |
| 2021/0255520 A1* | 8/2021 | Tomizawa | .................. | G09F 9/302 |
| 2022/0165225 A1* | 5/2022 | Zhang | .................. | G09G 3/035 |
| 2022/0317538 A1* | 10/2022 | Zhang | .................. | G09G 3/344 |
| 2023/0152656 A1* | 5/2023 | Wang | .................. | G02F 1/1681 |
| | | | | 359/265 |

FOREIGN PATENT DOCUMENTS

| | | | |
|---|---|---|---|
| CN | 111951738 | A | 11/2020 |
| CN | 113380201 | A | 9/2021 |
| CN | 113450729 | A | 9/2021 |
| CN | 113870803 | A | 12/2021 |
| CN | 114078449 | A | 2/2022 |

\* cited by examiner

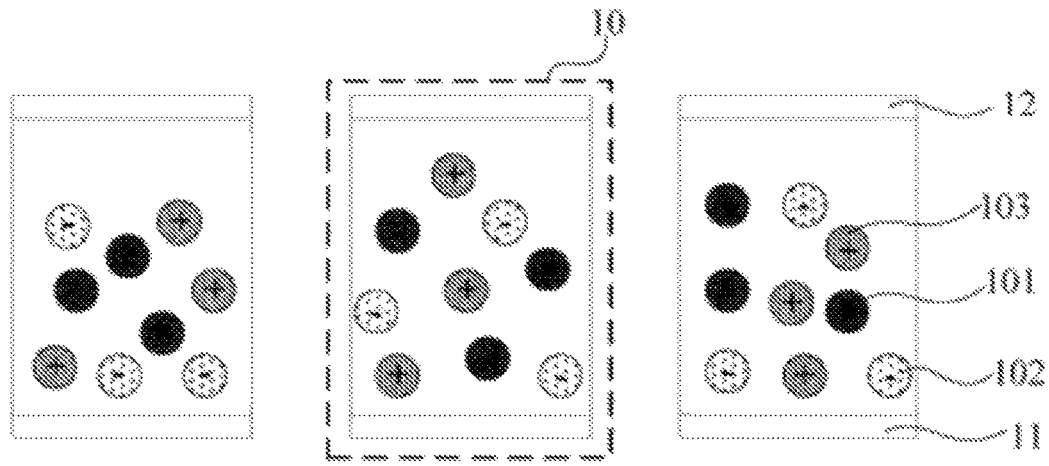

FIG. 1

Based on an image to be displayed, apply a first driving signal to first electrodes in macrostructures which are required to display black, apply a second driving signal 02 to the first electrodes in the microstructures which are required to display white, and apply a third driving signal to the first electrodes in the microstructures which are required to display red, wherein the first driving signal includes a first sub-driving signal in a first sub-shaking stage, the second driving signal includes a second sub-driving signal in the first sub-shaking stage, the third driving signal includes a third sub-driving signal in the first sub-shaking stage, and the first sub-driving signal, the second sub-driving signal and the third sub-driving signal each include a first pulse signal in which a negative voltage, a zero voltage, and a positive voltage are sequentially alternated in the first sub-shaking stage  S100

Apply a voltage signal to the second electrodes in the microstructures, wherein the voltage signal includes an alternating second pulse signal in which a positive voltage, a zero voltage, and a negative voltage are sequentially alternated in the first sub-shaking stage, and the first pulse signal applied on the first electrodes and the second pulse signal applied on the second electrodes opposite to the first electrodes are equal in an absolute value of an active voltage thereof, and are opposite to each other in voltage polarity  S200

FIG. 2

METHOD AND FOR DRIVING ELECTRONIC PAPER DISPLAY DEVICE, DEVICE, AND READABLE MEDIUM

CROSS-REFERENCE TO RELATED APPLICATION

This is a National Phase Application filed under 35 U.S.C. 371 as a national stage of PCT/CN2022/084620, filed on Mar. 31, 2022, the contents of which are incorporated herein in their entirety by reference.

TECHNICAL FIELD

The present disclosure relates to the field of display technology, and particularly relates to a method for driving an electronic paper display device, an electronic paper display device, and a readable medium.

BACKGROUND

Electronic paper (E-paper, also called electronic ink) display devices have received widespread attention because of their eye-protecting and power-saving effects.

The electronic paper display device includes a plurality of microstructures, and a first electrode and a second electrode on two opposite sides of each microstructure. Electrophoretic particles are packaged in each microstructure and each electrophoretic particle includes positively charged black particles, positively charged red particles and negatively charged white particles. Electrophoresis refers to a phenomenon in which charged solutes or particles move in an electric field towards an electrode that is charged oppositely to the charged solutes or particles.

The electronic paper display device controls movement of the electrophoretic particles by controlling an electric field generated by the first electrode and the second electrode. When black particles are driven to move to a top end of the microstructure by the electric field generated by the first electrode and the second electrode, the microstructure displays black; when white particles are driven to move to the top end of the microstructure by the electric field generated by the first electrode and the second electrode, the microstructure displays white; when red particles are driven to move to the top end of the microstructure by the electric field generated by the first electrode and the second electrode, the microstructure displays red. Based on this, the electrophoretic particles in semifluid inside the microstructures are driven, by changing the electric field formed by the first electrode and the second electrode by controlling a waveform, to move up or down to control the plurality of microstructures to display different colors, so that image display can be realized.

SUMMARY

The present disclosure is directed to solving at least one of the technical problems of the related art and provides a driving method for an electronic paper display device, an electronic paper display device, and a readable medium.

In a first aspect, an embodiment of the present disclosure provides a driving method for an electronic paper display device, wherein the electronic paper display device includes a plurality of microstructures, and a first electrode and a second electrode on two opposite sides of each of the plurality of microstructures, each of the plurality of microstructures includes black particles, white particles and red particles, charges of the black particles and charges of the white particles have opposite conductivity, the charges of the black particles and charges of the red particles have same conductivity, a charge-to-mass ratio of the black particles is greater than a charge-to-mass ratio of the red particles, a driving stage of the electronic paper display device is started at a first shaking stage, the first shaking stage includes a first sub-shaking stage, the driving stage of the electronic paper display device further includes a balance stage and a display stage, and the balance stage is prior to the display stage, and the method for driving the electronic paper display device includes: based on an image to be displayed, applying a first driving signal to first electrodes in macrostructures which are required to display black, applying a second driving signal to the first electrodes in the microstructures which are required to display white, and applying a third driving signal to the first electrodes in the microstructures which are required to display red, wherein the first driving signal includes a first sub-driving signal in the first sub-shaking stage, the second driving signal includes a second sub-driving signal in the first sub-shaking stage, the third driving signal includes a third sub-driving signal in the first sub-shaking stage, and the first sub-driving signal, the second sub-driving signal and the third sub-driving signal each include a first pulse signal in which a negative voltage, a zero voltage, and a positive voltage are sequentially alternated in the first sub-shaking stage; and applying a voltage signal to the second electrodes in the microstructures, wherein the voltage signal includes an alternating second pulse signal in which a positive voltage, a zero voltage, and a negative voltage are sequentially alternated in the first sub-shaking stage, and the first pulse signal applied on the first electrodes and the second pulse signal applied on the second electrodes opposite to the first electrodes are equal in an absolute value of an active voltage thereof, and are opposite to each other in voltage polarity.

In some embodiments, the first shaking stage further includes a second sub-shaking stage, the second sub-shaking stage being before the balance stage, after the first sub-shaking stage; the first driving signal further includes a plurality of repeated fourth sub-driving signals in the second sub-shaking stage, the second driving signal further includes a plurality of repeated fifth sub-driving signals in the second sub-shaking stage, and the third driving signal further includes a plurality of repeated sixth sub-driving signals in the second sub-shaking stage; and each of the plurality of fourth sub-driving signals, each of the plurality of fifth sub-driving signals and each of the plurality of sixth sub-driving signals each includes a pulse signal in which positive and negative voltages are sequentially alternated, and a zero voltage subsequent to the pulse signal.

In some embodiments, a first time period during which the first, second and third driving signals are applied in the first sub-shaking stage is less than a second time period during which the first, second and third driving signals are applied in the second sub-shaking stage.

In some embodiments, the display stage includes a first sub-display stage, the first driving signal further includes a seventh sub-driving signal in the first sub-display stage, the seventh sub-driving signal is configured to drive the red particles in the microstructures for displaying red to move closer to a display side of the electronic paper display device than the white particles and the black particles, the seventh sub-driving signal includes at least two first pulse repetition units, and each first pulse repetition unit includes a zero voltage and a first voltage which are sequentially applied to the first electrodes; the second driving signal further includes an eighth sub-driving signal in the first sub-display stage, the eighth sub-driving signal includes a pulse signal in which negative and positive voltages are sequentially alternated, and the positive voltage of the pulse signal of the eighth sub-driving signal is synchronized with one first pulse repetition unit of the seventh sub-driving signal; and the third driving signal further includes a ninth sub-driving signal in the first sub-display stage, the ninth sub-driving signal includes a pulse signal in which negative and positive voltages are sequentially alternated, and the positive voltage of the pulse signal of the ninth sub-driving signal is synchronized with another first pulse repetition unit of the seventh sub-driving signal.

In some embodiments, the display stage further includes a second sub-display stage and a third sub-display stage, the first driving signal further includes a tenth sub-driving signal in the second sub-display stage and an eleventh sub-driving signal in the third sub-display stage, the tenth sub-driving signal and the eleventh sub-driving signal each include a second voltage, a zero voltage, and a third voltage sequentially applied to the first electrodes, wherein the second voltage is configured to drive the black particles in the microstructures for displaying red to move away from the display side of the electronic paper display device relative to the red particles and the white particles, the third voltage is configured to drive the red particles in the microstructures for displaying red to move closer to the display side of the electronic paper display device than the black particles and the white particles; and an absolute value of an active voltage of the second voltage is equal to an absolute value of the first voltage and is greater than an absolute value of the third voltage, and a voltage polarity of the second voltage is opposite to a voltage polarity of the first voltage and a voltage polarity of the third voltage.

In some embodiments, the third driving signal further includes a twelfth sub-driving signal in the second sub-display stage, the twelfth sub-driving signal being applied in synchronization with the second voltage of the tenth sub-driving signal, so as to drive the white particles to move closer to the display side of the electronic paper display device than the black particles and the red particles, and to drive the black particles to move away from the display side of the electronic paper display device relative to the red particles.

In some embodiments, in the ninth sub-driving signal, a time period during which the negative voltage is applied is longer than a time period during which the positive voltage is applied.

In some embodiments, the voltage signal applied on the second electrodes further includes an alternating third pulse signal in the third sub-display stage, the third pulse signal and the second voltage of the eleventh sub-driving signal are equal in an absolute value of an active voltage thereof, and are opposite to each other in voltage polarity, the third pulse signal is configured to drive the white particles in the microstructures for displaying red to move closer to the display side of the electronic paper display device than the red particles and the black particles; and the second driving signal further includes a thirteenth sub-driving signal in the third sub-display stage, the third driving signal further includes a fourteenth sub-driving signal in the third sub-display stage, and the thirteenth sub-driving signal and the fourteenth sub-driving signal are applied synchronously with the third pulse signal, and active voltages of the thirteenth sub-driving signal and the fourteenth sub-driving signal have a same voltage polarity and a same absolute value as those of the third pulse signal.

In some embodiments, the display stage further includes a fourth sub-display stage, the first driving signal further includes a fifteenth sub-driving signal in the fourth sub-display stage, the fifteenth sub-driving signal includes at least two second pulse repetition units, and each second pulse repetition unit includes a third voltage and a zero voltage sequentially applied to the first electrodes; and the second driving signal further includes a sixteenth sub-driving signal in the fourth sub-display stage, the sixteenth sub-driving signal includes at least two third pulse repetition units, each third pulse repetition units includes a first voltage and a zero voltage sequentially applied to the first electrodes.

In some embodiments, the display stage further includes a fifth sub-display stage and a sixth sub-display stage, the first driving signal further includes a seventeenth sub-driving signal in the fifth sub-display stage and an eighteenth sub-driving signal in the sixth sub-display stage, the seventeenth and eighteenth sub-driving signals are configured to drive the red particles in the microstructures for displaying red to move closer to the display side of the electronic paper display device than the white and black particles in the fifth and sixth sub-display stages; the seventeenth sub-driving signal includes a fourth pulse signal and a fifth pulse signal sequentially applied to the first electrodes, and absolute values and voltage polarities of active voltages of the fourth pulse signal and the fifth pulse signal are the same as those of the active voltage of the third voltage; and the eighteenth sub-driving signal includes a sixth pulse signal having a same active voltage as the fourth pulse signal and the fifth pulse signal.

In some embodiments, the third driving signal further includes a nineteenth sub-driving signal in the fifth sub-display stage, the nineteenth sub-driving signal is configured to drive the white particles in the microstructures for displaying white to move closer to the display side of the electronic paper display device than the red particles and the black particles in the fifth sub-display stage, and a time period during which the nineteenth sub-driving signal is applied is between a time period during which the fourth pulse signal is applied and a time period during which the fifth pulse signal is applied.

In some embodiments, the second driving signal further includes a twentieth sub-driving signal in the sixth sub-display stage, the twentieth sub-driving signal is configured to drive the black particles in the microstructures for displaying black to move closer to the display side of the electronic paper display device than the red particles and the white particles, and an absolute value of an active voltage of the twentieth sub-driving signal is greater than an absolute value of an active voltage of the eighteenth sub-driving signal, and a start time of the active voltage of the twentieth sub-driving signal is earlier than a start time of the active voltage of the eighteenth sub-driving signal.

In some embodiments, the driving stage of the electronic paper display device further includes a second shaking stage, the second shaking stage being after the balance stage and before the displaying stage; the first, second and third driving signals include a twenty-first, twenty-second, and twenty-third sub-driving signals, respectively, in the second shaking stage; and the twenty-first sub-driving signal, the twenty-second sub-driving signal and the twenty-third sub-driving signal each include a pulse signal with positive and negative voltages alternating in sequence.

In some embodiments, the first driving signal further includes a twenty-fourth sub-driving signal in the balance stage, the second driving signal further includes a twenty-fifth sub-driving signal in the balance stage, and the third driving signal further includes a twenty-sixth sub-driving signal in the balance stage; and the twenty-fourth sub-driving signal, the twenty-fifth sub-driving signal, and the twenty-sixth sub-driving signal are configured such that a sum of a total number of charges in the black particles, the white particles, and the red particles equal to zero within each microstructure.

In a second aspect, embodiments of the present disclosure further provide an electronic paper display device, including a plurality of microstructures, and a first electrode and a second electrode on two opposite sides of each of the plurality of microstructures, wherein each of the plurality of microstructures includes black particles, white particles and red particles, charges of the black particles and charges of the white particles have opposite conductivity, the charges of the black particles and charges of the red particles have same conductivity, a charge-to-mass ratio of the black particles is greater than a charge-to-mass ratio of the red particles, a driving stage of the electronic paper display device is started at a first shaking stage, the first shaking stage includes a first sub-shaking stage, the driving stage of the electronic paper display device further includes a balance stage and a display stage, and the balance stage is prior to the display stage, the electronic paper display device further includes a processor configured to: based on an image to be displayed, apply a first driving signal to first electrodes in macrostructures which are required to display black; apply a second driving signal to the first electrodes in the microstructures which are required to display white; and apply a third driving signal to the first electrodes in the microstructures which are required to display red, wherein the first driving signal includes a first sub-driving signal in the first sub-shaking stage, the second driving signal includes a second sub-driving signal in the first sub-shaking stage, the third driving signal includes a third sub-driving signal in the first sub-shaking stage, and the first sub-driving signal, the second sub-driving signal and the third sub-driving signal each include a first pulse signal in which a negative voltage, a zero voltage, and a positive voltage are sequentially alternated in the first sub-shaking stage; and apply a voltage signal to the second electrodes in the microstructures, wherein the voltage signal includes an alternating second pulse signal in which a positive voltage, a zero voltage, and a negative voltage are sequentially alternated in the first sub-shaking stage, and the first pulse signal applied on the first electrodes and the second pulse signal applied on the second electrodes opposite to the first electrodes are equal in an absolute value of an active voltage thereof, and are opposite to each other in voltage polarity.

In a third aspect, embodiments of the present disclosure also provide a non-transitory computer readable medium, having stored thereon a computer program which, when executed by a processor, implements any one of the method described above.

BRIEF DESCRIPTION OF DRAWINGS

FIG. 1 is a schematic structural diagram of a microstructure according to an embodiment of the present disclosure;

FIG. 2 is a schematic flow chart of a driving method for an electronic paper display device according to an embodiment of the present disclosure;

DETAIL DESCRIPTION OF EMBODIMENTS

Figure 3:
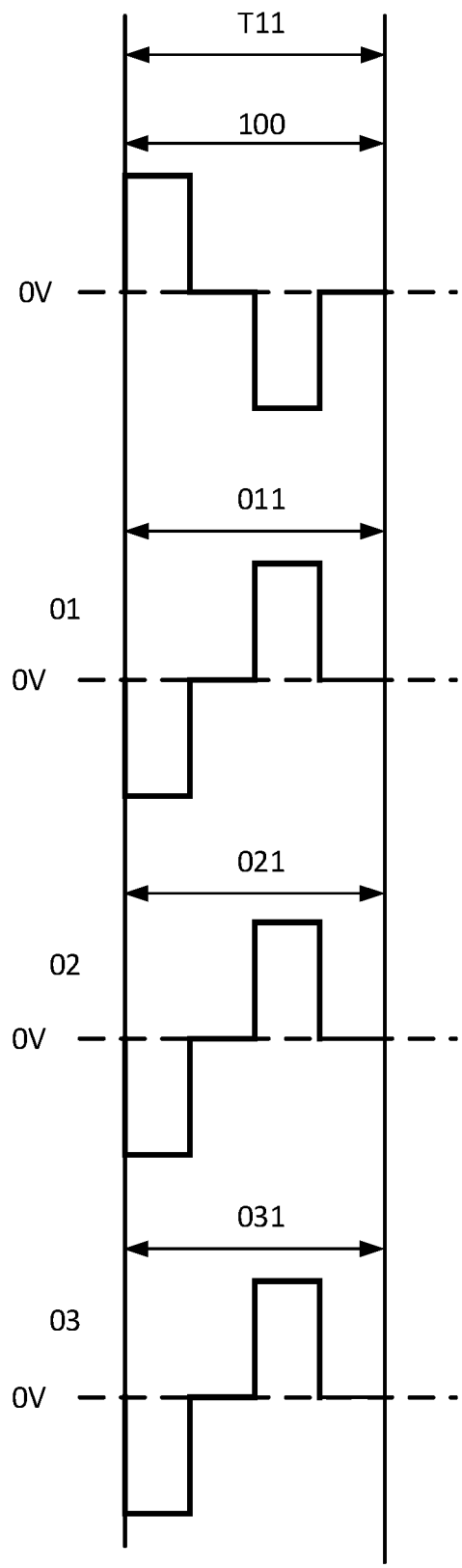
FIG. 3 is a timing diagram of a first sub-shaking stage of a driving method for an electronic paper display device according to an embodiment of the present disclosure.

In order to enable one of ordinary skill in the art to better understand the technical solutions of the present disclosure/utility model, the present disclosure/utility model will be described in further detail with reference to the accompanying drawings and the specific embodiments.

Unless defined otherwise, technical or scientific terms used herein shall have the ordinary meanings as understood by one of ordinary skill in the art to which the present disclosure belongs. The term "first," "second," or the like used in the present disclosure is not intended to indicate any order, quantity, or importance, but rather is used to distinguish one element from another. Also, the term "a," "an," "the" or similar referent does not denote a limitation of quantity, but rather denote the presence of at least one. The word "comprise", "include", or the like, means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The term "upper", "lower", "left", "right", or the like is used only to indicate relative positional relationship, and when an absolute position of the object being described is changed, the relative positional relationship may also be changed accordingly.

As shown in FIG. 1, an exemplary electronic paper display device includes a plurality of microstructures 10, and a first electrode 11 and a second electrode 12 disposed on opposite sides of each microstructure 10; each of the plurality of microstructures 10 includes three colors of charged particles; the three colors of charged particles are white particles 102, black particles 101, and color particles respectively. The color particles include, but are not limited to, red particles 103, and the description will be given by taking a case where the color particles are the red particles 103 as an example in the embodiments of the present disclosure. The black particles 101 have charges with conductivity opposite to that of the charges of the white particles 102 and the charges of the black particles 101 have the same conductivity as the red particles 103, and a charge-to-mass ratio of the black particles 101 is greater than that of the red particles 103.

It will be understood by one of ordinary skill in the art that since the black particles 101 and the red particles 103 have the charges of the same conductivity, and the charge-to-mass ratio of the black particles 101 is greater than that of the red particles 103, a moving speed of the black particles 101 is greater than that of the red particles 103 when the electric field is generated by applying the voltage to the first and second electrodes 11 and 12.

It should be noted that positions of the first electrode 11 and the second electrode 12 on the two opposite sides of the microstructure 10 are not limited; the first electrode 11 may be closer to a display side of the electronic paper display device than the second electrode 12, that is, a side where the first electrode is located is the display side of the electronic paper display device. Alternatively, the second electrode 12 may be closer to the display side of the electronic paper display device than the first electrode 11, that is, a side where the second electrode is located is the display side of the electronic paper display device. In embodiments of the present disclosure, the description will be given by taking a case where the second electrode 12 is closer to the display side of the electronic paper display device than the first electrode 11 shown in FIG. 1 as an example.

In addition, the second electrodes 12 corresponding to the microstructures 10 may be electrically coupled together, and in this case, voltage signals applied to the second electrodes 12 are the same, and the second electrodes 12 may be referred to as common electrodes (also referred to as Vcom electrodes). Of course, the second electrodes 12 corresponding to the microstructures 10 may not be electrically coupled together, and in this case, the voltage signals applied to the second electrodes 12 may be the same or different. The second electrodes 12 may be grounded (i.e., 0V voltage) in some embodiments.

The conductivity of the charges of the black particles 101, the white particles 102, and the red particles 103 are not limited. The black particles 101 and the red particles 103 may have positive charges, the white particles 102 may have negative charges. Alternatively, the black particles 101 and the red particles 103 may have negative charges, and the white particles 102 may have positive charges. In an embodiment of the present disclosure, the description will be given by taking a case where the black particles 101 and the red particles 103 have positive charges, and the white particles 102 have negative charges as an example.

In the prior art, a driving stage of the electronic paper display device sequentially includes: a balance stage, a shaking stage, a balance stage, a shaking stage and a display stage. Since the balance stage is started without fully shaking the charged particles in a previous frame, probability of occurrence of ghost in a current frame is high.

In order to solve the above problems, the following technical solutions are provided in the embodiments of the present disclosure.

In a first aspect, regarding the electronic paper display device shown in FIG. 1, the driving of the electronic paper display device is started at a first shaking stage T1, the driving stage of the electronic paper display device further includes a balance stage T2 and a display stage T4, and the balance stage T2 is prior to the display stage T4.

As shown in FIGS. 2 and 3, an embodiment of the present disclosure provides a driving method for an electronic paper display device, and the method includes Steps S100 and S200.

Step S100 includes, applying a first driving signal 01 to first electrodes 11 in macrostructures which are required to display black, applying a second driving signal 02 to first electrodes 11 in microstructures 10 which are required to display white, and applying a third driving signal 03 to first electrodes 11 in microstructures 10 which are required to display red, based on an image to be displayed. The first driving signal 01 includes a first sub-driving signal 011 in a first sub-shaking stage T11, the second driving signal 02 includes a second sub-driving signal 021 in the first sub-shaking stage T11, and the third driving signal 03 includes a third sub-driving signal 031 in the first sub-shaking stage T11; the first sub-driving signal 011, the second sub-driving signal 021 and the third sub-driving signal 031 each include a first pulse signal in which a negative voltage, a zero voltage, a positive voltage and a zero voltage are sequentially alternated in the first sub-shaking stage T11.

The first driving signal 01 is configured to drive the red particles 103 to move closer to the display side of the electronic paper display device than the white particles 102 and the black particles 101 in the display stage T4. That is to say, the first driving signal 01 is applied to the first electrode 11 of each microstructure 10 which is required to display red, the first electrode 11 and the corresponding second electrode 12 generate an electric field therebetween, and in the display stage T4, the electric field drives the red particles 103 to move towards the second electrode 12 side, so that the microstructures 10 display red at the display side of the electronic paper display device, thereby displaying red part of the image to be displayed. It should be understood that since the red particles 103 have the positive charges, the first driving signal 01 applied to the first electrode 11 should be a positive voltage signal, and a voltage value of the positive voltage signal should be sufficient to move the red particles 103.

The second driving signal is configured to drive the black particles 101 to move closer to the display side of the electronic paper display device than the white particles 102 and the red particles 103 in the display stage T4. That is, the second driving signal 02 is applied to the first electrode 11 of each microstructure 10 which is required to display black, the first electrode 11 and the corresponding second electrode 12 generate an electric field therebetween, and in the display stage T4, the electric field drives the black particles 101 to move towards the second electrode 12 side, so that the microstructures 10 display black at the display side of the electronic paper display device, thereby displaying the black part of the image to be displayed. It should be understood that since the black particles 101 have the positive charges, the second driving signal 02 applied to the first electrode 11 should be a positive voltage signal, and a voltage value of the positive voltage signal should be sufficient to move the black particles 101.

The third driving signal is configured to drive the white particles 103 to move closer to the display side of the electronic paper display device than the black particles 101 and the red particles 103 in the display stage T4. That is, the third driving signal 03 is applied to the first electrode 11 of each microstructure 10 which is required to display white, the first electrode 11 and the corresponding second electrode 12 generate an electric field therebetween, and in the display stage T4, the electric field drives the white particles 101 to move toward the second electrode 12 side, so that the microstructures 10 display white at the display side of the electronic paper display device, thereby displaying white part of the image to be displayed. It should be understood that since the white particles 101 have the negative charges, the third driving signal 03 applied to the first electrode 11 should be a negative voltage signal, and a voltage value of the negative voltage signal should be sufficient to move the white particles 101.

In an embodiment of the present disclosure, the first sub-shaking stage T11 is prior to the balance stage T2, and the first, second and third driving signals 01, 02 and 03 respectively include first, second and third sub-driving signals 011, 021 and 031 in the first sub-shaking stage T11; the first sub-driving signal 011, the second sub-driving signal 021 and the third sub-driving signal 031 each include a first pulse signal in which a negative voltage, a zero voltage, and a positive voltage are sequentially alternated, so that the black particles 101, the white particles 102 and the red particles 103 in each microstructure 10 can be fully separated and uniformly mixed in the first sub-shaking stage T11, thereby reducing the probability of the occurrence of the ghost.

In an embodiment of the present disclosure, the number of the first pulse signals of each of the first sub-driving signal 011, the second sub-driving signal 021 and the third sub-driving signal 031 is not limited, and may be specifically set as required. FIG. 3 is an example where only one first pulse signal is included.

Step S200 includes applying a voltage signal to the second electrodes 12 in the microstructures 10, the voltage signal includes an alternating second pulse signal 100 in which a positive voltage, a zero voltage, and a negative voltage are sequentially alternated in the first sub-shaking stage T11, the first pulse signal on the first electrodes 11 and the second pulse signal 100 on the second electrodes 12 opposite to the first electrodes 11 are equal in an absolute value of an active voltage thereof, and are opposite to each other in voltage polarity (that is, the first pulse signal and the second pulse signal are inverted with each other).

In the prior art, each second electrode 12 is usually grounded (i.e. 0V voltage). However in the embodiments of the present disclosure, an alternating voltage is applied to the second electrode 12, and the alternating voltage is inverted with the voltage applied to the first electrode 11, so that compared with the scheme that the second electrode 12 is grounded, an absolute value of a potential difference between the second electrode 12 and the corresponding first electrode 11 for forming the electric field is doubled, the potential difference is significantly increased, and the effect of driving the charged particles to move is increased.

It should be noted that since the driving signal applied to the first electrode 11 and the voltage signal applied to the corresponding second electrode 12 form an electric field, one of ordinary skill in the art will appreciate that steps S100 and S200 may be performed synchronously.

In some embodiments, the first shaking stage T1 also includes a second sub-shaking stage T12, the second sub-shaking stage T12 being before the balance stage T2 and after the first sub-shaking stage T11.

Figure 4:
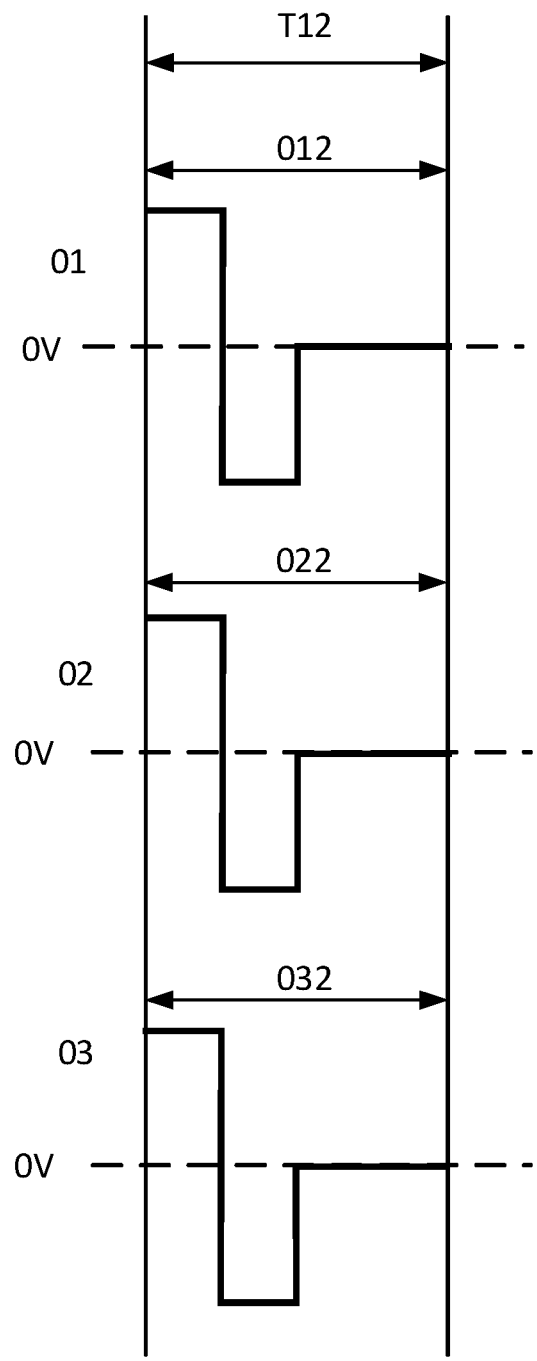
FIG. 4 is a timing diagram of a second sub-shaking stage of the driving method for the electronic paper display device according to the embodiment of the present disclosure.

As shown in FIG. 4, the first driving signal 01 further includes a plurality of repeated fourth sub-driving signals 012 in the second sub-shaking stage T12, the second driving signal 02 further includes a plurality of repeated fifth sub-driving signals 022 in the second sub-shaking stage T12, and the third driving signal 03 further includes a plurality of repeated sixth sub-driving signals 032 in the second sub-shaking stage T12. Each of the fourth sub-driving signals 012, the fifth sub-driving signals 022, and the sixth sub-driving signals 032 includes a pulse signal in which positive and negative voltages are sequentially alternated, and a zero voltage subsequent to the pulse signal.

In the second sub-shaking stage T12, the black particles 101, the white particles 102, and the red particles 103 are rapidly and intensely moved by the pulse signal in which the positive voltage and the negative voltage are sequentially alternated, so as to be further sufficiently separated and uniformly mixed, and then the zero voltage is applied to slowly stop the movement of the charged particles, thereby improving the effect of shaking the charged particles.

In some embodiments, a first time period during which the first driving signal 01, the second driving signal 02 and the third driving signal 03 are applied in the first sub-shaking stage T11 is less than a second time period during which the first driving signal 01, the second driving signal 02 and the third driving signal 03 are applied in the second sub-shaking stage T12. That is, the time period (i.e., the first time period) during which the first sub-driving signal 011, the second sub-driving signal 021 and the third sub-driving signal 031 are applied to the first electrodes 11 in the first sub-shaking stage T11 is shorter than the time period (i.e., the second time period) during which the fourth sub-driving signal 012, the fifth sub-driving signal 022 and the sixth sub-driving signal 032 are applied to the first electrodes 11 in the second sub-shaking stage T12, so that distances among various charged particles are adjusted with a high strength for a short time in the first sub-shaking stage T11, and the distances among various charged particles are adjusted with a low strength for a long time in the second sub-shaking stage T12, thereby achieving sufficient shaking of various charged particles after the display of the previous frame and further reducing the probability of the occurrence of the ghost in the current frame.

It should be noted that FIG. 4 only shows one fourth sub-driving signal unit 012, one fifth sub-driving signal unit 022, and one sixth sub-driving signal unit 032 in the second sub-shaking stage T12. In practical applications, the fourth sub-driving signal unit 012, the fifth sub-driving signal unit 022, and the sixth sub-driving signal unit 032 are repeated multiple times. According to the embodiments of the present disclosure, the second time period during which the first driving signal 01, the second driving signal 02, and the third driving signal 03 are applied refers to an accumulated time period during which the fourth sub-driving signal unit 012, the fifth sub-driving signal unit 022, and the sixth sub-driving signal unit 032 are repeated multiple times.

The driving signal applied to the first electrodes 11 and the voltage signal applied to the second electrodes 12 in the display stage T4 according to the embodiment of the present disclosure are described in detail below with reference to FIGS. 5 to 8.

Figure 5:
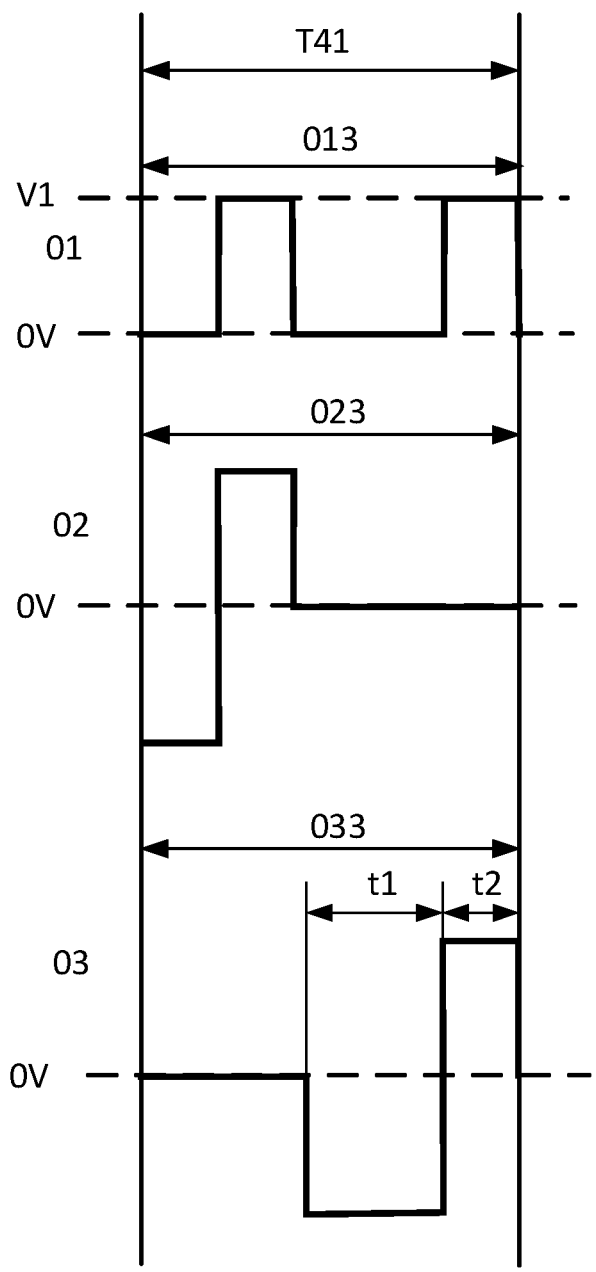
FIG. 5 is a timing diagram of a first sub-display stage of the driving method for the electronic paper display device according to an embodiment of the present disclosure.

In some embodiments, as shown in FIG. 5, the display stage T4 includes a first sub-display stage T41, the first driving signal 01 further includes a seventh sub-driving signal 013 in the first sub-display stage T41, the seventh sub-driving signal 013 is configured to drive the red particles in the microstructures 10 for displaying red to move closer to the display side of the electronic paper display device than the white particles and the black particles, the seventh sub-driving signal 013 includes at least two first pulse repetition units, and each first pulse repetition unit includes a zero voltage and a first voltage V1 which are sequentially applied to the first electrodes. In some embodiments, the first voltage V1 is in a range from 11V to 15V.

The second driving signal 02 further includes an eighth sub-driving signal 023 in the first sub-display stage T41, the eighth sub-driving signal 023 includes a pulse signal in which negative and positive voltages are sequentially alternated, and the positive voltage of the pulse signal of the eighth sub-driving signal 023 is synchronized with one first pulse repetition unit of the seventh sub-driving signal 013. In an embodiment of the present disclosure, as shown in FIG. 5, the positive voltage of the pulse signal of the eighth sub-driving signal 023 is synchronized with the first voltage of the first one of the first pulse repetition units of the seventh sub-driving signal 013.

In the first sub-display stage T41, the black particles 101 are solely shook by the eighth sub-driving signal 023, and the positive voltage of the pulse signal of the eighth sub-driving signal 023 is synchronized with the first voltage of one first pulse repetition unit in the seventh sub-driving signal 013, so that the black optical display effect can be improved while red imaging is realized, which further eliminates the ghost.

The third driving signal 03 further includes a ninth sub-driving signal 033 in the first sub-display stage T41, the ninth sub-driving signal 033 includes a pulse signal in which negative and positive voltages are sequentially alternated, a positive voltage of the pulse signal of the ninth sub-driving signal 033 is synchronized with another first pulse repetition unit in the seventh sub-driving signal 013. In an embodiment of the present disclosure, as shown in FIG. 5, the positive voltage of the pulse signal of the ninth sub-driving signal 033 is synchronized with the first voltage of the second one of the first pulse repetition units of the seventh sub-driving signal 013.

In the first sub-display stage T41, the white particles 102 are solely shook by the ninth sub-driving signal 033, and the positive voltage of the pulse signal of the ninth sub-driving signal 033 is synchronized with another first pulse repetition unit in the seventh sub-driving signal 013, so that the white optical display effect can be improved while red imaging is realized (both L value and A value (chromaticity) can be improved), which further eliminates the ghost.

Figure 6:
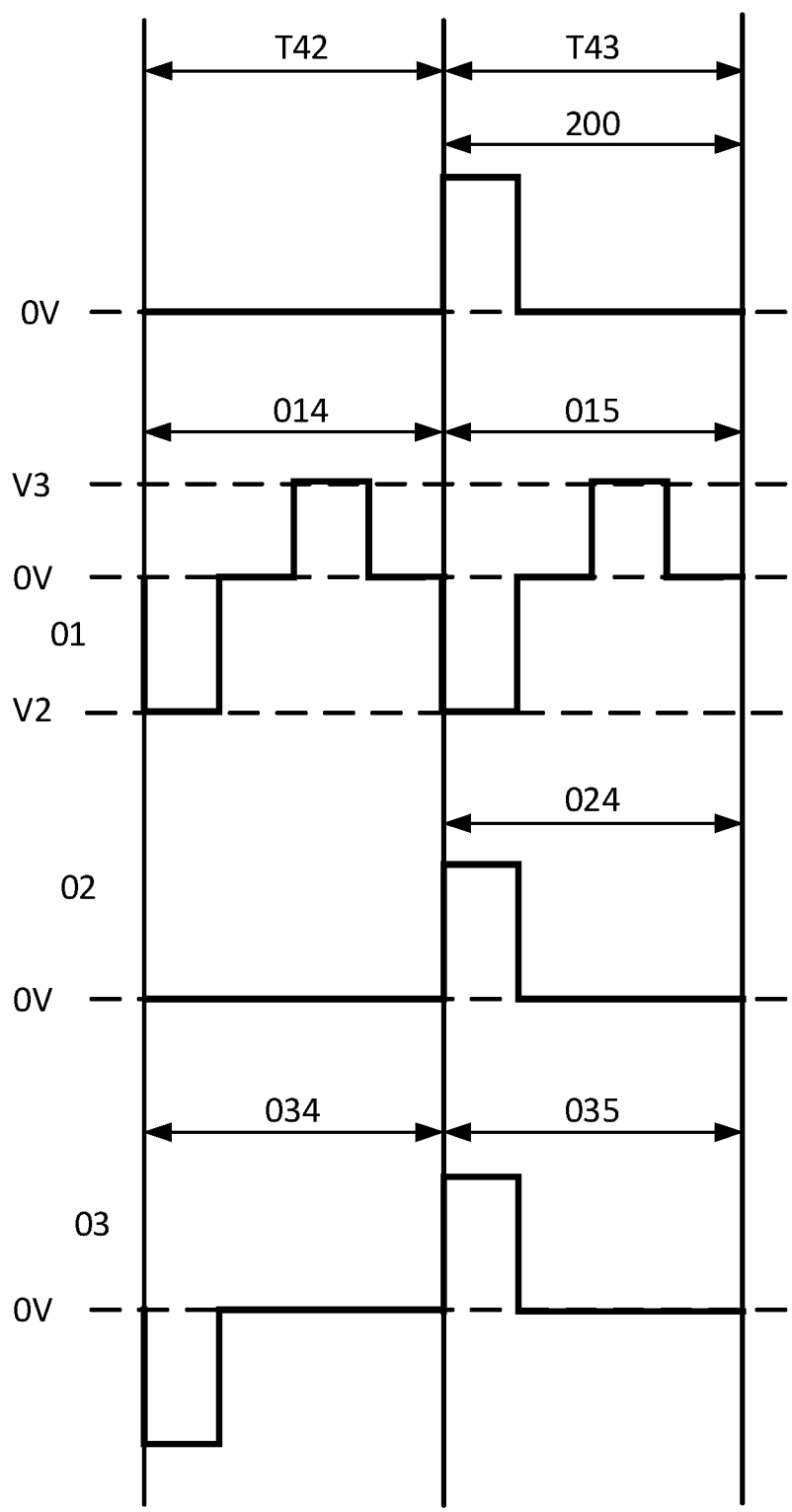
FIG. 6 is a timing diagram of a second sub-display stage and a third sub-display stage of the driving method for the electronic paper display device according to the embodiment of the present disclosure.

In some embodiments, as shown in FIG. 6, the display stage T4 further includes a second sub-display stage T42 and a third sub-display stage T43. The first driving signal 01 further includes a tenth sub-driving signal 014 in the second sub-display stage T42 and an eleventh sub-driving signal 015 in the third sub-display stage T43. The tenth sub-driving signal 014 and the eleventh sub-driving signal 015 each include a second voltage V2, a zero voltage and a third voltage V3 which are sequentially applied to the first electrodes 11. The second voltage V2 is configured to drive the black particles 101 in the microstructures 10 for displaying red to move away from the display side of the electronic paper display device relative to the red particles 103 and the white particles 102, and the third voltage V3 is configured to drive the red particles 103 in the microstructures 10 for displaying red to move closer to the display side of the electronic paper display device than the black particles 101 and the white particles 102. An absolute value of an active voltage of the second voltage V2 is equal to the absolute value of the first voltage V1 and is greater than an absolute value of the third voltage V3, and a voltage polarity of the second voltage V2 is opposite to voltage polarities of the first voltage V1 and the third voltage V3. In some embodiments, the second voltage V2 is in a range from −11V to −15V, and the first voltage V3 is in a range from 4V to 7V.

In the embodiment of the present disclosure, in the second sub-display stage T42, firstly, the negative second voltage V2 having a larger value is applied to the red particles 103, and a force in an opposite direction is applied to the red particles 103 and the black particles 101 in the microstructures 10 for displaying red, so as to drive the red particles 103 and the black particles 101 to move away from the display side of the electronic paper display device. It is noted that since the black particles 101 and the red particles 103 have the charges with the same conductivity, and the charge-to-mass ratio of the black particles 101 is larger than that of the red particles 103, when a voltage is applied to the first electrode 11 and the second electrode 12 to generate an electric field, moving speed of the black particles 101 is higher than that of the red particles 103, that is, the activity of the black particles 101 is higher than that of the red particles 103. Therefore, the black particles 101 can be driven to a position away from the display side of the electronic paper display device at a higher speed than the red particles 103 by applying the negative second voltage V2 having a larger value to the red particles 103, thereby increasing the distance between the black particles 101 and the red particles 103 and separating the black particles 101 from the red particles 103. Then, the positive third voltage V3 with a smaller value is applied to the red particles 103 to re-drive the red particles 103 away from the display side of the electronic paper display device to arrive at the display side of the electronic paper display device. The red particles 103 may be driven closer to the display side of the electronic paper display device than the black particles 101 each time the tenth sub-driving signal 014 is applied, and the red display may be gradually realized by gradually increasing the distance between the red particles 103 and the black particles 101 by applying the tenth sub-driving signal 014 multiple times.

In some embodiments, as shown in FIG. 6, the third driving signal 03 further includes a twelfth sub-driving signal 034 in the second sub-display stage T42, the twelfth sub-driving signal 034 being applied in synchronization with the second voltage V2 of the tenth sub-driving signal 014, so as to drive the white particles 102 to move closer to the display side than the black particles 101 and the red particles 103, and to drive the black particles 101 to move away from the display side of the electronic paper display device relative to the red particles 103. In a case where the black particles 101 and the red particles 103 have positive charges and the white particles 102 have negative charges, the twelfth sub-driving signal 034 is a pulse signal of a negative voltage.

In the second sub-display stage T42, the negative second voltage V2 with a larger value is applied to the first electrodes 11 in the microstructures 10 for displaying red, on one hand, the black particles 101 may be driven to move in a direction away from the display side of the electronic paper display device, and meanwhile, the pulse signal with a negative voltage (i.e., the twelfth sub-driving signal 034) is applied to the first electrodes 11 in the microstructures 10 for displaying white, so as drive the white particles 102 to move in the direction close to the display side of the electronic paper display device, and thus the black at the edge of the red font is removed, and the case that the red font on the white background is blackened is improved; on the other hand, the display effect of the white radar line can also be enhanced.

In some embodiments, as shown in FIG. 5, a time period t1 during which the negative voltage in the ninth sub-driving signal 033 is applied is longer than a time period t2 during which the positive voltage is applied, i.e., a pulse width of the negative voltage in the ninth sub-driving signal 033 is greater than a pulse width of the positive voltage in the ninth sub-driving signal 033.

Before the white particles 102 are driven to move toward the display side of the electronic paper display device in the second sub-display stage T42, in the first sub-display stage T41, the time period during which the positive and negative voltages of the ninth sub-driving signal 033 are applied is controlled to achieve a uniform length, so that the positions of the white particles 102 can be controlled better, the white chromaticity (A value) can be reduced, and the white imaging effect can be improved.

In some embodiments, as shown in FIG. 6, the voltage on the second electrodes 12 further includes an alternating third pulse signal 200 in the third sub-display stage T43, the third pulse signal 200 and the second voltage V2 of the eleventh sub-driving signal 015 are equal in the absolute value of the active voltage thereof, and are opposite to each other in voltage polarity. The third pulse signal 200 is configured to drive the white particles 102 in the microstructures 10 for displaying red to move closer to the display side of the electronic paper display device than the red particles 103 and the black particles 101. That is, the third pulse signal 200 includes a positive voltage signal, and the absolute value of the active voltage thereof is the same as the absolute value of the active voltage of the second voltage V2.

Since the red particles 103 are driven to move closer to the display side of the electronic paper display device than the black particles 101 and the white particles 102 by the seventh sub-driving signal 013 and the tenth sub-driving signal 014 in the first sub-display stage T41 and the second sub-display stage T42, respectively, and the white particles 102 are driven to move closer to the display side of the electronic paper display device than the black particles 101 and the red particles 103 by the twelfth sub-driving signal 034 in the second sub-display stage T42, luminance of the red display screen is reduced and the red optical display effect is poor. In the embodiments of the present disclosure, in the third sub-display stage T43, the third pulse signal 200 is applied to each second electrode 12, so that the absolute value of the potential difference in the electric field formed by the second electrode 12 and the corresponding first electrode 11 is doubled, the potential difference is significantly increased, the effect of driving the red particles 103 to move is increased, and the red optical display effect can be greatly improved.

The second driving signal 02 further includes a thirteenth sub-driving signal 024 in a third sub-display stage T43, the third driving signal 03 further includes a fourteenth sub-driving signal 035 in the third sub-display stage T43, and the thirteenth sub-driving signal 024 and the fourteenth sub-driving signal 035 are applied in synchronization with the third pulse signal 200, and are equal to the absolute value of the active voltage of the third pulse signal 200 and have the same voltage polarity with the third pulse signal 200. That is, the thirteenth sub-driving signal 024 and the fourteenth sub-driving signal 035 are positive voltage signals, and the absolute values of the active voltages thereof are the same as the absolute value of the active voltage of the second voltage V2.

Since the third pulse signal 200 is a positive voltage signal, it may also drive the white particles 102 to move toward the display side of the electronic paper display device, resulting in a decrease in the brightness of the display screen of red. In order to solve the problem, in an embodiment of the present disclosure, while the alternating third pulse signal 200 is applied to the second electrodes 12 in the third sub-display stage T43, the thirteenth sub-driving signal 024 is applied to the first electrodes 11 of the microstructures 10 for displaying black, and the fourteenth sub-driving signal 035 is applied to the first electrodes 11 of the microstructures 10 for displaying white, so as to balance the third pulse signal 200 applied to the second electrodes 12, counteract the decrease in the brightness of the display screen of red due to the third pulse signal 200, improve the display effect of red font on a white background, and improve the black optical display effect.

Figure 7:
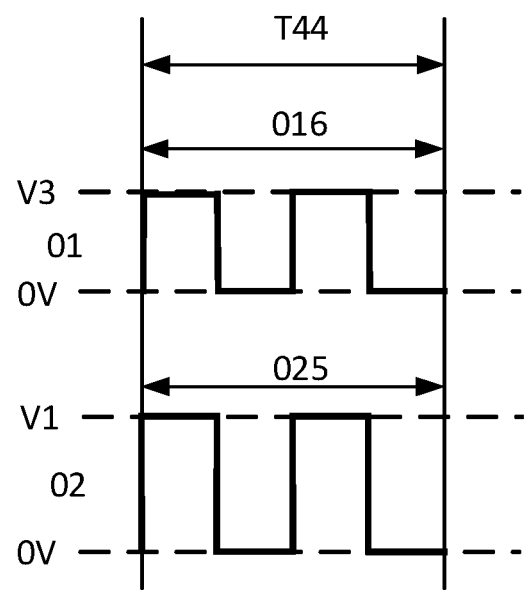
FIG. 7 is a timing diagram of a fourth sub-display stage of the driving method for the electronic paper display device according to the embodiment of the present disclosure.

In some embodiments, as shown in FIG. 7, the display stage T4 further includes a fourth sub-display stage T44, the first driving signal 01 further includes a fifteenth sub-driving signal 016 in the fourth sub-display stage T44, the fifteenth sub-driving signal 016 includes at least two second pulse repetition units, and each second pulse repetition unit includes a third voltage V3 and a zero voltage which are sequentially applied to the first electrodes 11.

The second driving signal 02 further includes a sixteenth sub-driving signal 025 in the fourth sub-display stage T44, the sixteenth sub-driving signal 025 includes at least two third pulse repetition units, and each third pulse repetition unit includes the first voltage V1 and a zero voltage sequentially applied to the first electrodes 11.

In the fourth sub-display stage T44, the positive third voltage V3 with a smaller value and the positive first voltage V1 with a larger vale are respectively applied to the first electrodes 11 in the microstructures 10 for displaying red and the first electrodes 11 in the microstructures 10 for displaying black, so as to drive simultaneously the red particles 103 and the black particles 101 to move towards the display side of the electronic paper display device, so that the display brightness of red is improved, and the black particles 101 are more quickly close to the display side of the electronic paper display device than the red particles 103, thereby enhancing the display effect of black font on a red background.

Figure 8:
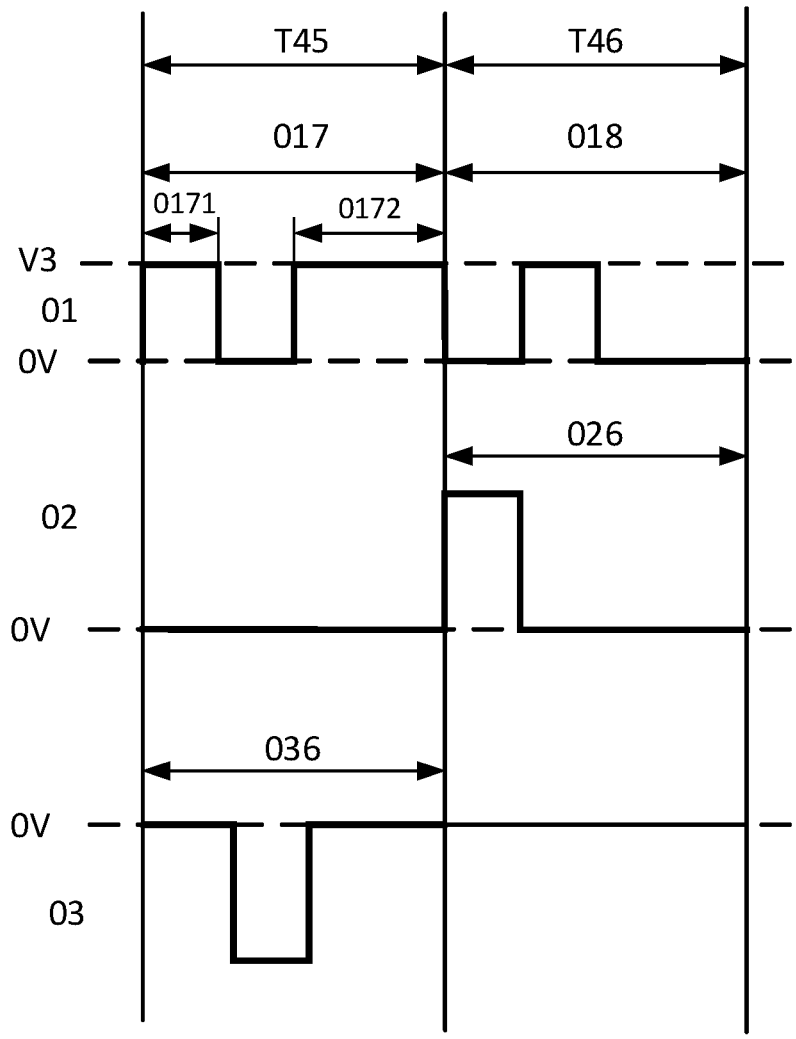
FIG. 8 is a timing diagram of a fifth sub-display stage and a sixth sub-display stage of the driving method for the electronic paper display device according to the embodiment of the present disclosure.

In some embodiments, as shown in FIG. 8, the display stage T4 further includes a fifth sub-display stage T45 and a sixth sub-display stage T46, the first driving signal 01 further includes a seventeenth sub-driving signal 017 in the fifth sub-display stage and an eighteenth sub-driving signal 018 in the sixth sub-display stage. The seventeenth sub-driving signal 017 and the eighteenth sub-driving signal 018 are configured to drive the red particles 103 in the microstructures 10 for displaying red to move closer to the display side of the electronic paper display device than the white particles 102 and the black particles 101 in the fifth sub-display stage T45 and the sixth sub-display stage T46.

The seventeenth sub-driving signal 017 includes a fourth pulse signal 0171 and a fifth pulse signal 0172 sequentially applied to the first electrodes 11, and the absolute values and voltage polarities of the active voltages of the fourth pulse signal 0171 and the fifth pulse signal 0172 are the same as those of the third voltage V3. It should be noted that a time period during which the fourth pulse signal 0171 is applied may be less than a time period during which the fifth pulse signal 0172 is applied. Alternatively, the time period during which the fourth pulse signal 0171 is applied may also be equal to the time period during which the fifth pulse signal 0172 is applied. In an embodiment of the present disclosure, as shown in FIG. 8, the time period during which the fourth pulse signal 0171 is applied is less than the time period during which the fifth pulse signal 0172 is applied, that is, a pulse width of the fourth pulse signal 0171 is less than a pulse width of the fifth pulse signal 0172.

The eighteenth sub-driving signal 018 includes a sixth pulse signal having the same active voltage value as the fourth pulse signal 0171 and the fifth pulse signal 0172.

In the fifth sub-display stage T45 and the sixth sub-display stage T46, the seventeenth sub-driving signal 017 and the eighteenth sub-driving signal 018 continue to drive the red particles 103 in the microstructures 10 for displaying red to move towards the display side of the electronic paper display device, so as to improve the bezel lines and enhance the red display effect in the edge area of the electronic paper display device.

In some embodiments, as shown in FIG. 8, the third driving signal 03 further includes a nineteenth sub-driving signal 036 in the fifth sub-display stage T45, the nineteenth sub-driving signal 036 is configured to drive the white particles 102 in the microstructures 10 for displaying white to move closer to the display side of the electronic paper display device than the red particles 103 and the black particles 101 in the fifth sub-display stage T45, and a time period during which the nineteenth sub-driving signal 036 is applied is between a time period during which the fourth pulse signal 0171 is applied and a time period during which the fifth pulse signal 0172 is applied. When the black particles 101 and the red particles 103 have positive charges and the white particles 102 have negative charges, the nineteenth sub-driving signal 036 is a pulse signal of a negative voltage.

In the third sub-display stage T43 and the fourth sub-display stage T44, the red particles 103 are driven to move to the display side of the electronic paper display device, which will affect the white font to be displayed. In order to solve the above problem, in the embodiment of the present disclosure, in the fifth sub-display stage T45, the nineteenth sub-driving signal 036 is used to drive the white particles 102 to move towards the display side of the electronic paper display device, so that the display effect of the white font can be improved, and the display effect of the white radar lines can also be enhanced.

In some embodiments, as shown in FIG. 8, the second driving signal 02 further includes a twentieth sub-driving signal 026 in the sixth sub-display stage T46, the twentieth sub-driving signal 026 is configured to drive the black particles 101 in the microstructures 10 for displaying black to move closer to the display side of the electronic paper display device than the red particles 103 and the white particles 102, and an absolute value of an active voltage of the twentieth sub-driving signal 026 is greater than an absolute value of an active voltage of the eighteenth sub-driving signal 018, and a start time of the active voltage of the twentieth sub-driving signal 026 is earlier than a start time of the active voltage of the eighteenth sub-driving signal 018. That is, the black particles 101 in the microstructures 10 for displaying black are driven to move closer to the display side of the electronic paper display device than the red particles 103 and the white particles 102, and then the red particles 103 in the microstructures 10 for displaying red are driven to move closer to the display side of the electronic paper display device than the black particles 101 and the white particles 102.

In the prior art, in the display stage T4, firstly, the black particles 101 in the microstructure 10 for displaying black are driven to move closer to the display side of the electronic paper display device than the red particles 103 and the white particles 102, and then the red particles 103 in the microstructures 10 for displaying red are driven to move closer to the display side of the electronic paper display device than the black particles 101 and the white particles 102. In this case, a negative voltage is applied to the first electrodes 11 in the microstructures 10 for displaying red, so that the black display effect is affected. In the embodiment of the present disclosure, the red particles 103 in the microstructures 10 for displaying red are driven to move towards the display side of the electronic paper display device in the first sub-display stage T41, the second sub-display stage T42, the third sub-display stage T43, the fourth sub-display stage T44 and the fifth sub-display stage T45, and the black particles 101 in the microstructures 10 for displaying black are driven to move towards the display side of the electronic paper display device in the sixth sub-display stage T46. In this way, the display of black font cannot be influenced, and the display effect of the black font on the red background is improved.

Figure 9:
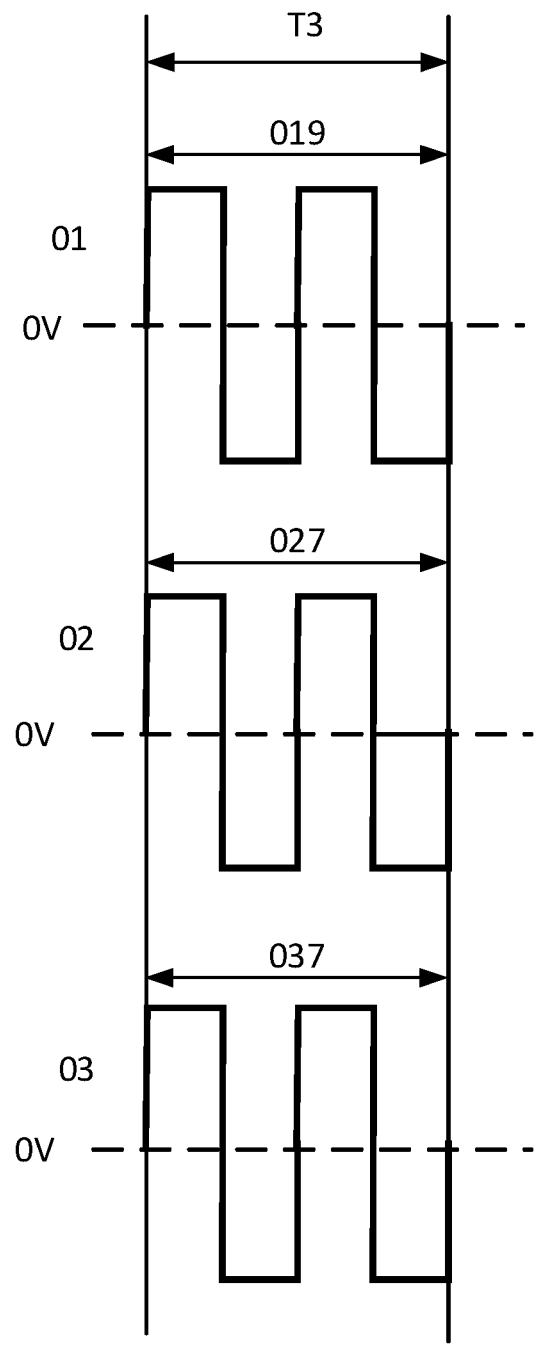
FIG. 9 is a timing diagram of a second shaking stage of the driving method for the electronic paper display device according to the embodiment of the present disclosure.

In some embodiments, the driving stage of the electronic paper display device further includes a second shaking stage T3, the second shaking stage T3 being after the balance stage T2 and before the display stage T4. As shown in FIG. 9, the first driving signal 01, the second driving signal 02 and the third driving signal 03 respectively include a twenty-first sub-driving signal 019, a twenty-second sub-driving signal 027, and a twenty-third sub-driving signal 037 in the second shaking stage T3; the twenty-first sub-driving signal 019, the twenty-second sub-driving signal 027 and the twenty-third sub-driving signal 037 each include a pulse signal with alternating positive and negative voltages.

After the balance stage T2, the shaking stage is performed again to separate the black particles 101, the white particles 102, and the red particles 103 from each other, so that the particles of different colors intensively stay at corresponding positions in the space of each microstructure 10 and maintain proper spacing among them, thereby reducing the accumulation speed of the ghost caused by the frame switching.

In an embodiment of the present disclosure, the numbers of the pulse signals of the twenty-first sub-driving signal 019, the twenty-second sub-driving signal 027, and the twenty-third sub-driving signal 037 are not limited, and may be specifically set as needed. FIG. 9 is only an example of the case where one first pulse signal is included.

Figure 10:
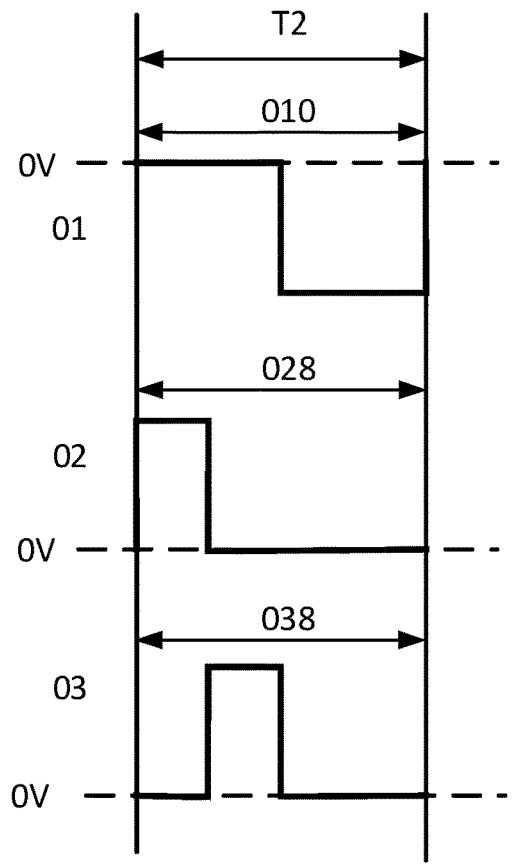
FIG. 10 is a timing diagram of a balance stage of the driving method for the electronic paper display device according to an embodiment of the present disclosure.

In some embodiments, as shown in FIG. 10, the first driving signal 01 further includes a twenty-fourth sub-driving signal 010 in the balance stage T2, the second driving signal 02 further includes a twenty-fifth sub-driving signal 028 in the balance stage T2, and the third driving signal 03 further includes a twenty-sixth sub-driving signal 038 in the balance stage T2. The twenty-fourth sub-driving signal 010, the twenty-fifth sub-driving signal 028, and the twenty-sixth sub-driving signal 038 are configured such that a sum of the total number of charges in the black particles 101, the white particles 102, and the red particles 103 is equal to zero within each microstructure 10.

It should be noted that based on a limitation of IC function and EPD (Electrophoretic Display or E-Paper Display) power consumption, the solution of the embodiments of the present disclosure can be applied to an electronic paper display device having a size in a range of 5.65 inches to 12 inches.

In the driving method for the electronic paper display device provided by the embodiments of the present disclosure, shaking is performed before the balance stage T2, so as to thoroughly breaks up the positions of the charged particles at the end of the previous frame, thereby achieving a better imaging effect.

In the embodiments of the present disclosure, the two existing balance stages are shorten into one balance stage, which increases the time of the display stage T4, and is beneficial to the adjustment of the frame in the display stage T4. In the first sub-shaking stage T11 and the third sub-display stage T43, an alternating voltage signal is applied to the second electrodes 12, and power is simultaneously supplied to the second electrodes 12 and the first electrodes 11, so that the potential difference inside the microstructures is increased, and the charged particles can be more effectively driven to move.

In the embodiments of the present disclosure, while in the third sub-display stage T43, the alternating third pulse signal 200 is applied to the second electrodes 12, the thirteenth sub-driving signal 024 is applied to the first electrodes 11 of the microstructures 10 for displaying black, and the fourteenth sub-driving signal 035 is applied to the first electrodes 11 of the microstructures 10 for displaying white, so as to balance the third pulse signal 200 applied to the second electrodes 12, counteract the reduction of the brightness of the red display screen caused by the third pulse signal 200, improve the display effect of the red font on the white background, and improve the black optical display effect.

In the embodiments of the present disclosure, compared to the prior art, the sequence of driving the red particles 103 and the black particles 101 to move to the display side of the electronic paper display device is changed, that is, the red particles 103 in the microstructures 10 for displaying red are driven to move to the display side of the electronic paper display device in the first sub-display stage T41, the second sub-display stage T42, and the third sub-display stage T43, and then the black particles 101 in the microstructures 10 for displaying black are driven to move to the display side of the electronic paper display device in the fourth sub-display stage T44 and the sixth sub-display stage T46, which does not influence the display of black font and improves the display effect of a black font on a red background.

In the embodiments of the present disclosure, before the white particles 102 in the microstructures 10 for displaying white to move toward the display side of the electronic paper display device in the second sub-display stage T42, a uniform length can be achieved by controlling the time period of the positive and negative voltages of the ninth sub-driving signal 033 in the first sub-display stage T41, which can better control the positions of the white particles 102, and reduce the white chromaticity (A value), thereby improving the white imaging effect.

Figure 11:
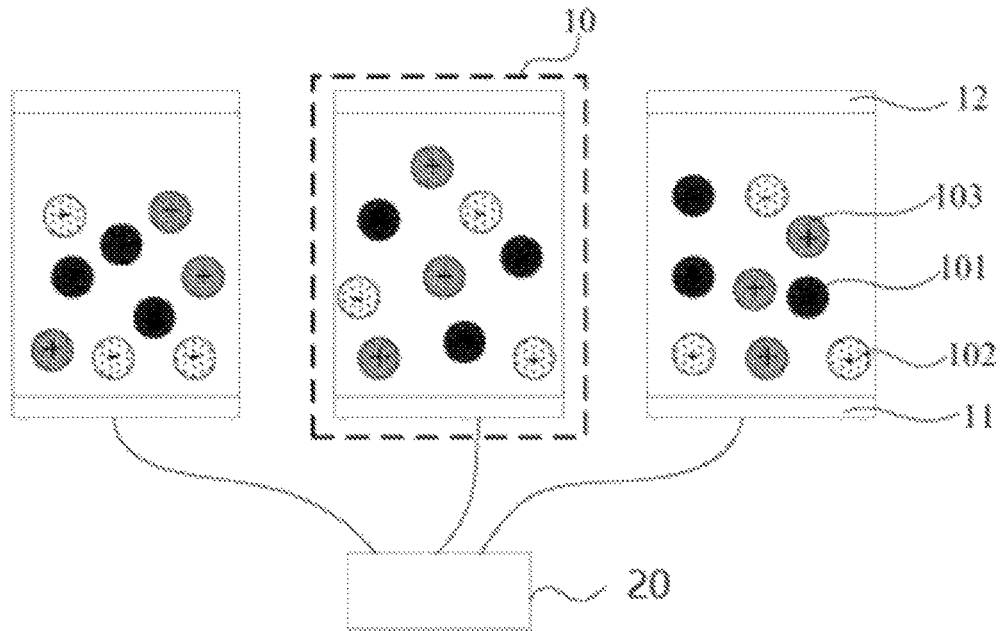
FIG. 11 is a schematic structural diagram of an electronic paper display device according to an embodiment of the present disclosure.

In a second aspect, as shown in FIG. 11, an embodiment of the present disclosure provides an electronic paper display device, including a plurality of microstructures 10, and a first electrode 11 and a second electrode 12 disposed on two opposite sides of each microstructure 10. Each microstructure 10 includes black particles 101, white particles 102 and red particles 103, charges of the black particles 101 and charges of the white particles 102 have an opposite conductivity, and the charges of the black particles 101 and charges of the red particles 103 have the same conductivity; and a charge-to-mass ratio of the black particles 101 is larger than a charge-to-mass ratio of the red particles 103.

A driving stage of the electronic paper display device is started at a first shaking stage T1, the first shaking stage T1 includes a first sub-shaking stage T11, the driving stage of the electronic paper display device further includes a balance stage T2 and a display stage T4, and the balance stage T2 is prior to the display stage T4.

As shown in FIG. 11, the electronic paper display device further includes a processor 20. The processor 20 is configured to, based on an image to be displayed, apply a first driving signal 01 to first electrodes in microstructures which are required to display black, apply a second driving signal 02 to first electrodes 11 in the microstructures 10 which are required to display white, and apply a third driving signal 03 to first electrodes 11 in microstructures which are required to display red. The first driving signal 01 includes a first sub-driving signal 011 in the first sub-shaking stage T11, the second driving signal 02 includes a second sub-driving signal 021 in the first sub-shaking stage T11, and the third driving signal 03 includes a third sub-driving signal 031 in the first sub-shaking stage T11. The first sub-driving signal 011, the second sub-driving signal 021 and the third sub-driving signal 031 each include a first pulse signal in which a negative voltage, a zero voltage, and a positive voltage are sequentially alternated in the first sub-shaking stage T11. The processor 20 is further configured to, based on the image to be displayed, apply a voltage signal to second electrodes in the microstructures 10, the voltage signal includes an alternating second pulse signal 100 in which a positive voltage, a zero voltage, a negative voltage and a zero voltage are sequentially alternated in the first sub-shaking period T11, and an active voltage of the first pulse signal on the first electrodes 11 and an active voltage of the second pulse signal 100 on the second electrodes 12 opposite to the first electrodes 11 have the same absolute value and opposite voltage polarities.

In the electronic paper display device in the embodiment of the present disclosure, the first sub-shaking stage T11 is prior to the balance stage T2 in the driving stage, and the first driving signal 01, the second driving signal 02 and the third driving signal 03 respectively include the first sub-driving signal 011, the second sub-driving signal 021 and the third sub-driving signal 031 in the first sub-shaking stage T11; the first sub-driving signal 011, the second sub-driving signal 021 and the third sub-driving signal 031 each include a first pulse signal in which a negative voltage, a zero voltage, a positive voltage and a zero voltage are sequentially alternated, so that the black particles 101, the white particles 102 and the red particles 103 in each microstructure 10 can be fully separated and uniformly mixed in the first sub-shaking stage T11, thereby reducing the occurrence probability of the ghost. In addition, the absolute value of the potential difference of the electric field formed by each second electrode 12 and the corresponding first electrode 11 is doubled, the potential difference is obviously increased, and the effect of driving the charged particles to move is increased.

It should be noted that the explanation and effect of the processor 20 may be reference to the driving method for the electronic paper display device, and a description thereof is not repeated here.

In a third aspect, embodiments of the present disclosure further provide a non-transitory computer readable medium, on which a computer program is stored. When the computer program is executed by a processor, the driving method for the electronic paper display device in any one of the above embodiments may be implemented.

It is to be understood that the above embodiments are merely exemplary embodiments adopted to illustrate the principles of the present disclosure/utility model, but the present disclosure/utility model is not limited thereto. It will be apparent to one of ordinary skill in the art that various modifications and improvements can be made without departing from the spirit and scope of the present disclosure/utility model, and such modifications and improvements are also considered to be within the scope of the present disclosure/utility model.

What is claimed is:

1. A method for driving an electronic paper display device, wherein the electronic paper display device comprises a plurality of microstructures, and a first electrode and a second electrode on two opposite sides of each of the plurality of microstructures, each of the plurality of microstructures comprises black particles, white particles and red particles, charges of the black particles and charges of the white particles have opposite conductivity, the charges of the black particles and charges of the red particles have same conductivity, a charge-to-mass ratio of the black particles is greater than a charge-to-mass ratio of the red particles, wherein a driving stage of the electronic paper display device is started at a first shaking stage, the first shaking stage comprises a first sub-shaking stage, the driving stage of the electronic paper display device further comprises a balance stage and a display stage, and the balance stage is prior to the display stage, and the method for driving the electronic paper display device comprises:

based on an image to be displayed, applying a first driving signal to first electrodes in macrostructures which are required to display black, applying a second driving signal to the first electrodes in the microstructures which are required to display white, and applying a third driving signal to the first electrodes in the microstructures which are required to display red, wherein the first driving signal comprises a first sub-driving signal in the first sub-shaking stage, the second driving signal comprises a second sub-driving signal in the first sub-shaking stage, the third driving signal comprises a third sub-driving signal in the first sub-shaking stage, and the first sub-driving signal, the second sub-driving signal and the third sub-driving signal each comprise a first pulse signal in which a negative voltage, a zero voltage, a positive voltage and a zero voltage are sequentially alternated in the first sub-shaking stage; and applying a voltage signal to the second electrodes in the microstructures, wherein the voltage signal comprises an alternating second pulse signal in which a positive voltage, a zero voltage, and a negative voltage and a zero voltage are sequentially alternated in the first sub-shaking stage, and the first pulse signal applied on the first electrodes and the second pulse signal applied on the second electrodes opposite to the first electrodes are equal in an absolute value of an active voltage thereof, and are opposite to each other in voltage polarity.

2. The method of claim 1, wherein the first shaking stage further comprises a second sub-shaking stage, the second sub-shaking stage being before the balance stage and after the first sub-shaking stage;

the first driving signal further comprises a plurality of repeated fourth sub-driving signals in the second sub-shaking stage, the second driving signal further comprises a plurality of repeated fifth sub-driving signals in the second sub-shaking stage, and the third driving signal further comprises a plurality of repeated sixth sub-driving signals in the second sub-shaking stage; and each of the plurality of fourth sub-driving signals, the plurality of fifth sub-driving signals and the plurality of sixth sub-driving signals comprises a pulse signal in which positive and negative voltages are sequentially alternated, and a zero voltage subsequent to the pulse signal.

3. The method of claim 2, wherein the display stage comprises a first sub-display stage, the first driving signal further comprises a seventh sub-driving signal in the first sub-display stage, the seventh sub-driving signal is configured to drive the red particles in the microstructures for displaying red to move closer to a display side of the electronic paper display device than the white particles and the black particles, the seventh sub-driving signal comprises at least two first pulse repetition units, and each first pulse repetition unit comprises a zero voltage and a first voltage which are sequentially applied to the first electrodes;

the second driving signal further comprises an eighth sub-driving signal in the first sub-display stage, the eighth sub-driving signal comprises a pulse signal in which negative and positive voltages are sequentially alternated, and the positive voltage of the pulse signal of the eighth sub-driving signal is synchronized with the positive voltage of one first pulse repetition unit of the seventh sub-driving signal; and the third driving signal further comprises a ninth sub-driving signal in the first sub-display stage, the ninth sub-driving signal comprises a pulse signal in which negative and positive voltages are sequentially alternated, and the positive voltage of the pulse signal of the ninth sub-driving signal is synchronized with the positive voltage of another first pulse repetition unit of the seventh sub-driving signal.

4. The method of claim 3, wherein the display stage further comprises a second sub-display stage and a third sub-display stage, the first driving signal further comprises a tenth sub-driving signal in the second sub-display stage and an eleventh sub-driving signal in the third sub-display stage, the tenth sub-driving signal and the eleventh sub-driving signal each comprise a second voltage, a zero voltage, and a third voltage sequentially applied to the first electrodes, wherein the second voltage is configured to drive the black particles in the microstructures for displaying red to move away from the display side of the electronic paper display device relative to the red particles and the white particles, the third voltage is configured to drive the red particles in the microstructures for displaying red to move closer to the display side of the electronic paper display device than the black particles and the white particles; and an absolute value of an active voltage of the second voltage is equal to an absolute value of the first voltage and is greater than an absolute value of the third voltage, and a voltage polarity of the second voltage is opposite to a voltage polarity of the first voltage and a voltage polarity of the third voltage.

5. The method of claim 4, wherein the third driving signal further comprises a twelfth sub-driving signal in the second sub-display stage, the twelfth sub-driving signal being applied in synchronization with the second voltage of the tenth sub-driving signal, so as to drive the white particles to move closer to the display side of the electronic paper display device than the black particles and the red particles, and to drive the black particles to move away from the display side of the electronic paper display device relative to the red particles.

6. The method of claim 5, wherein in the ninth sub-driving signal, a time period during which the negative voltage is applied is longer than a time period during which the positive voltage is applied.

7. The method of to claim 4, wherein the voltage signal applied on the second electrodes further comprises an alternating third pulse signal in the third sub-display stage, the third pulse signal and the second voltage of the eleventh sub-driving signal are equal in an absolute value of an active voltage thereof, and are opposite to each other in voltage polarity, the third pulse signal is configured to drive the white particles in the microstructures for displaying red to move closer to the display side of the electronic paper display device than the red particles and the black particles; and the second driving signal further comprises a thirteenth sub-driving signal in the third sub-display stage, the third driving signal further comprises a fourteenth sub-driving signal in the third sub-display stage, and the thirteenth sub-driving signal and the fourteenth sub-driving signal are applied synchronously with the third pulse signal, and active voltages of the thirteenth sub-driving signal and the fourteenth sub-driving signal have a same absolute value and a same voltage polarity as those of the third pulse signal.

8. The method of claim 7, wherein the display stage further comprises a fourth sub-display stage, the first driving signal further comprises a fifteenth sub-driving signal in the fourth sub-display stage, the fifteenth sub-driving signal comprises at least two second pulse repetition units, and each second pulse repetition unit comprises a third voltage and a zero voltage sequentially applied to the first electrodes; and the second driving signal further comprises a sixteenth sub-driving signal in the fourth sub-display stage, the sixteenth sub-driving signal comprises at least two third pulse repetition units, each third pulse repetition units comprises a first voltage and a zero voltage sequentially applied to the first electrodes.

9. The method of claim 8, wherein the display stage further comprises a fifth sub-display stage and a sixth sub-display stage, the first driving signal further comprises a seventeenth sub-driving signal in the fifth sub-display stage and an eighteenth sub-driving signal in the sixth sub-display stage, the seventeenth and eighteenth sub-driving signals are configured to drive the red particles in the microstructures for displaying red to move closer to the display side of the electronic paper display device than the white and black particles in the fifth and sixth sub-display stages;

the seventeenth sub-driving signal comprises a fourth pulse signal and a fifth pulse signal sequentially applied to the first electrodes, and absolute values and voltage polarities of active voltages of the fourth pulse signal and the fifth pulse signal are the same as those of the active voltage of the third voltage; and the eighteenth sub-driving signal comprises a sixth pulse signal having a same active voltage as the fourth pulse signal and the fifth pulse signal.

10. The method of claim 9, wherein the third driving signal further comprises a nineteenth sub-driving signal in the fifth sub-display stage, the nineteenth sub-driving signal is configured to drive the white particles in the microstructures for displaying white to move closer to the display side of the electronic paper display device than the red particles and the black particles in the fifth sub-display stage, and a time period during which the nineteenth sub-driving signal is applied is between a time period during which the fourth pulse signal is applied and a time period during which the fifth pulse signal is applied.

11. The method of claim 9, wherein the second driving signal further comprises a twentieth sub-driving signal in the sixth sub-display stage, the twentieth sub-driving signal is configured to drive the black particles in the microstructures for displaying black to move closer to the display side of the electronic paper display device than the red particles and the white particles, and an absolute value of an active voltage of the twentieth sub-driving signal is greater than an absolute value of an active voltage of the eighteenth sub-driving signal, and a start time of the active voltage of the twentieth sub-driving signal is earlier than a start time of the active voltage of the eighteenth sub-driving signal.

12. The method of claim 1, wherein a first time period during which the first, second and third driving signals are applied in the first sub-shaking stage is less than a second time period during which the first, second and third driving signals are applied in the second sub-shaking stage.

13. The method of claim 1, wherein the driving stage of the electronic paper display device further comprises a second shaking stage, the second shaking stage being after the balance stage and before the displaying stage;

the first, second and third driving signals comprise a twenty-first, twenty-second, and twenty-third sub-driving signals, respectively, in the second shaking stage; and the twenty-first sub-driving signal, the twenty-second sub-driving signal and the twenty-third sub-driving signal each comprise a pulse signal with positive and negative voltages alternating in sequence.

14. The method of claim 1, wherein the first driving signal further comprises a twenty-fourth sub-driving signal in the balance stage, the second driving signal further comprises a twenty-fifth sub-driving signal in the balance stage, and the third driving signal further comprises a twenty-sixth sub-driving signal in the balance stage; and the twenty-fourth sub-driving signal, the twenty-fifth sub-driving signal, and the twenty-sixth sub-driving signal are configured such that a sum of a total number of charges in the black particles, the white particles, and the red particles equal to zero within each microstructure.

15. A non-transitory computer readable storage medium, having stored thereon a computer program which, when executed by a processor, implements the method of claim 1.

16. An electronic paper display device, comprising a plurality of microstructures, and a first electrode and a second electrode on two opposite sides of each of the plurality of microstructures, wherein each of the plurality of microstructures comprises black particles, white particles and red particles, charges of the black particles and charges of the white particles have opposite conductivity, the charges of the black particles and charges of the red particles have same conductivity, a charge-to-mass ratio of the black particles is greater than a charge-to-mass ratio of the red particles, a driving stage of the electronic paper display device is started at a first shaking stage, the first shaking stage comprises a first sub-shaking stage, the driving stage of the electronic paper display device further comprises a balance stage and a display stage, and the balance stage is prior to the display stage, the electronic paper display device further comprises a processor configured to:

based on an image to be displayed, apply a first driving signal to first electrodes in macrostructures which are required to display black; apply a second driving signal to the first electrodes in the microstructures which are required to display white; and apply a third driving signal to the first electrodes in the microstructures which are required to display red, wherein the first driving signal comprises a first sub-driving signal in the first sub-shaking stage, the second driving signal comprises a second sub-driving signal in the first sub-shaking stage, the third driving signal comprises a third sub-driving signal in the first sub-shaking stage, and the first sub-driving signal, the second sub-driving signal and the third sub-driving signal each comprise a first pulse signal in which a negative voltage, a zero voltage, a positive voltage and a zero voltage are sequentially alternated in the first sub-shaking stage; and apply a voltage signal to the second electrodes in the microstructures, wherein the voltage signal comprises an alternating second pulse signal in which a positive voltage, a zero voltage, a negative voltage and a zero voltage are sequentially alternated in the first sub-shaking stage, and the first pulse signal applied on the first electrodes and the second pulse signal applied on the second electrodes opposite to the first electrodes are equal in an absolute value of an active voltage thereof, and are opposite to each other in voltage polarity.

17. The electronic paper display device of claim 16, wherein the first shaking stage further comprises a second sub-shaking stage, the second sub-shaking stage being before the balance stage and after the first sub-shaking stage;

the first driving signal further comprises a plurality of repeated fourth sub-driving signals in the second sub-shaking stage, the second driving signal further comprises a plurality of repeated fifth sub-driving signals in the second sub-shaking stage, and the third driving signal further comprises a plurality of repeated sixth sub-driving signals in the second sub-shaking stage; and each of the plurality of fourth sub-driving signals, the plurality of fifth sub-driving signals and the plurality of sixth sub-driving signals comprises a pulse signal in which positive and negative voltages are sequentially alternated, and a zero voltage subsequent to the pulse signal.

18. The electronic paper display device of claim 17, wherein the display stage comprises a first sub-display stage, the first driving signal further comprises a seventh sub-driving signal in the first sub-display stage, the seventh sub-driving signal is configured to drive the red particles in the microstructures for displaying red to move closer to a display side of the electronic paper display device than the white particles and the black particles, the seventh sub-driving signal comprises at least two first pulse repetition units, and each first pulse repetition unit comprises a zero voltage and a first voltage which are sequentially applied to the first electrodes;

the second driving signal further comprises an eighth sub-driving signal in the first sub-display stage, the eighth sub-driving signal comprises a pulse signal in which negative and positive voltages are sequentially alternated, and the positive voltage of the pulse signal of the eighth sub-driving signal is synchronized with the positive voltage of one first pulse repetition unit of the seventh sub-driving signal; and the third driving signal further comprises a ninth sub-driving signal in the first sub-display stage, the ninth sub-driving signal comprises a pulse signal in which negative and positive voltages are sequentially alternated, and the positive voltage of the pulse signal of the ninth sub-driving signal is synchronized with the positive voltage of another first pulse repetition unit of the seventh sub-driving signal.

19. The electronic paper display device of claim 18, wherein the display stage further comprises a second sub-display stage and a third sub-display stage, the first driving signal further comprises a tenth sub-driving signal in the second sub-display stage and an eleventh sub-driving signal in the third sub-display stage, the tenth sub-driving signal and the eleventh sub-driving signal each comprise a second voltage, a zero voltage, and a third voltage sequentially applied to the first electrodes, wherein the second voltage is configured to drive the black particles in the microstructures for displaying red to move away from the display side of the electronic paper display device relative to the red particles and the white particles, the third voltage is configured to drive the red particles in the microstructures for displaying red to move closer to the display side of the electronic paper display device than the black particles and the white particles; and an absolute value of an active voltage of the second voltage is equal to an absolute value of the first voltage and is greater than an absolute value of the third voltage, and a voltage polarity of the second voltage is opposite to a voltage polarity of the first voltage and a voltage polarity of the third voltage.

20. The electronic paper display device of claim 16, wherein a first time period during which the first, second and third driving signals are applied in the first sub-shaking stage is less than a second time period during which the first, second and third driving signals are applied in the second sub-shaking stage.

* * * * *